3,016,340
METHOD IN THE ELECTROLYTICAL PRODUCTION OF ALUMINUM
Hans Fredrik Hygen, Nils Juelsgt. 12, Oslo, Norway
No Drawing. Filed Feb. 21, 1958, Ser. No. 716,534
2 Claims. (Cl. 204—67)

In the electrolytic production of aluminum from alumina ($Al_2O_3$) it is necessary to add about 40 kg. cryolite ($Na_3AlF_6$) and 20 kg. aluminum fluoride ($AlF_3$) to each 1000 kg. produced aluminum in replacement of the fluorine (F) losses and in order to maintain the correct composition of the electrolyte, which usually is of about the following composition:

| | Percent by weight |
|---|---|
| Cryolte | 64 |
| Aluminumfluoride | 21 |
| Calciumflouride ($CaF_2$) | 10 |
| Alumina ($Al_2O_3$) | 5 |
| Total | 100 |

The presence of calcium fluoride in the electrolyte usually is due to calcium impurities in the alumina. The other fluorides (cryolite and aluminum fluoride) are usually added in the form of powders, whereby dust losses, amounting to about 65% of the added fluorides occur, a fact which, due to the high prices of the fluorides, is harmful for economical reasons and which, when the dust is distributed over cultivated fields and pastures renders the grass fluoric, which may give rise to fluorosis and claims for reparation. The fluorides may also, when placed on the furnace frame as they usually are for the purpose of pre-heating the same, evaporate in various forms at the temperatures prevailing, at the same time as certain losses will occur in the form of fluoric gases, in particular hydrofluoric gas (HF), due to humidity present in the mass.

In the preparation of synthetic cryolite, granulation or agglomeration of the product has been effected for the purpose of reducing the dust losses, but this does not provide for an efficient solution of the problem, both because some dust will always accompany the granules and also because the bulk of the fluorides used in industry are natural cryolite in powder form and aluminumfluoride, which is also supplied in powder form. Flourine losses in gas form are also not prevented in this manner.

It is technically possible to smelt the fluorides in a separate closed furnace, whereby no dust loss occurs and then supply the several electrolytic furnaces with smelted fluorides, either in liquid form or in solid form as a sieved product of suitable grain size. Hereby a certain difficulty is, however, encountered, viz. the fact that the proportion of cryolite to aluminum fluoride is not constant in practice, as the proportion must be adjusted for the purpose of maintaining the composition of the several furnaces in accordance with the chemical analysis which has proved most correct.

The present invention relates to a method which provides an effective solution of the difficulties referred to, fluoride losses in various forms being thereby avoided.

According to the invention, the fluorides are introduced into the furnace enclosed in a suitable inorganic or organic material, such as aluminum or paper, which will not contaminate the molten electrolyte when inserted into the same. The material used may be a packing material, such as aluminum foil, boxes or tubes, the latter being closed by squeezing both ends around the packed material. In such cases the packing material is readily dissipated, the aluminum by melting, when the package is introduced into the molten electrolyte.

In all cases any liberation of powder prior to the introduction is effectively prevented.

When the fluorides are introduced in the form of packages, the proportion between fluorides conveniently may be varied by preparing standard packages of say 5 kg. containing the most usual composition of ⅔ croylite and ⅓ aluminum fluoride, and smaller packages for adjustment purposes. Packages may also be prepared merely containing cryolite and aluminumfluoride, respectively.

*Example*

When 33000 ampere electrolytic furnaces (pots) are used the production per furnace will be 230 kg. aluminum per 24 hours with a corresponding consumption of about 14 kg. fluorides. The potmen are generally working in three shifts of 8 hours and it will then be suitable to add to each pot per shift a package of about 4½ kg. fluorides and for instance every third day a smaller package of cryolite or aluminumfluoride after chemical control of the electrolytic bath.

I claim:
1. In the production of metallic aluminum by electrolytic reduction of alumina in a bath of fused electrolyte containing fluorides which is accompanied by the giving off of large amounts of carbon-oxygen gases, and in which the fluoride proportion and the quantity of the said electrolyte is periodically readjusted by adding fluorides to the electrolyte in a finely divided form such that it would be carried off by the carbon-oxygen gases unless precautions were taken to prevent it, that improvement in the step of adding the fluorides comprising enclosing a quantity of fluoride dust in said sufficiently finely divided form in an aluminum container, and forcing the aluminum container with the fluoride powder therein underneath the crust on the top of the bath directly into the electrolyte, whereby the finely divided fluoride dust is prevented from becoming entrained in the gases given off.

2. A method as claimed in claim 1 in which a plurality of fluorides are enclosed in said container.

References Cited in the file of this patent
UNITED STATES PATENTS

| | | |
|---|---|---|
| 2,245,505 | Siedentopf | June 10, 1941 |
| 2,444,424 | Brown et al. | July 6, 1948 |
| 2,593,741 | Ferrand | Apr. 22, 1952 |
| 2,713,024 | Mantovanello | July 12, 1955 |

OTHER REFERENCES

The Making, Shaping and Treating of Steel, Camp and Francis, 6th ed., 1951, page 477.